(No Model.)
J. L. FARNSWORTH.
COTTON SCRAPER.
No. 254,629. Patented Mar. 7, 1882.
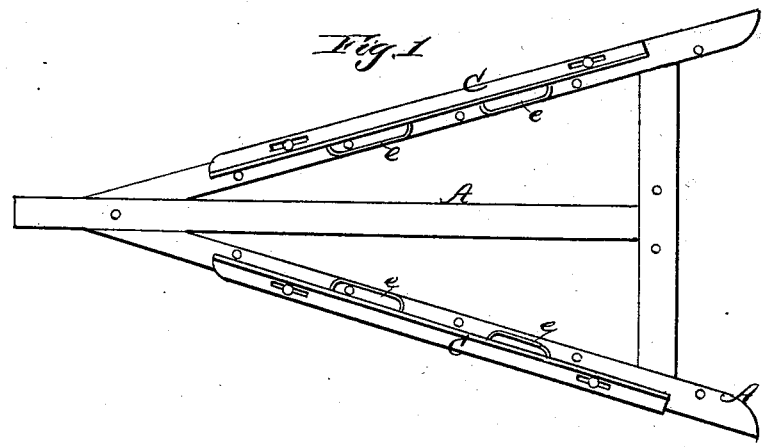
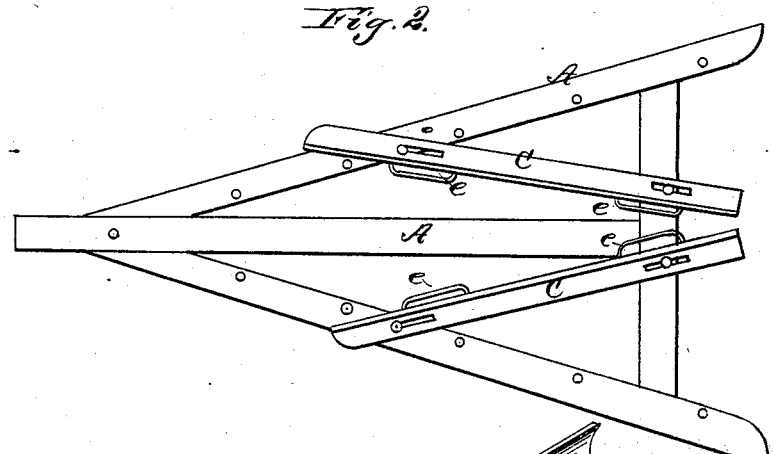
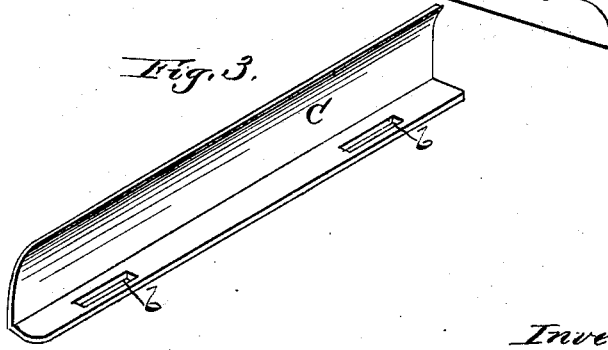
Witnesses:
H. C. McArthur
W. R. Keynorth
Inventor:
J. L. Farnsworth
per W. Alexander
Attorney

UNITED STATES PATENT OFFICE.

JAMES L. FARNSWORTH, OF DALTON, GEORGIA.

COTTON-SCRAPER.

SPECIFICATION forming part of Letters Patent No. 254,629, dated March 7, 1882.

Application filed July 14, 1881. (No model.)

*To all whom it may concern:*

Be it known that I, JAMES L. FARNSWORTH, of Dalton, in the county of Whitfield and State of Georgia, have invented certain new and useful Improvements in Cotton-Scrapers; and I do hereby declare that the following is a full, clear, and exact description thereof, reference being had to the accompanying drawings, and to the letters of reference marked thereon, which form part of this specification, in which—

Figure 1 is a bottom plan view of a common cultivator or harrow with my invention attached for throwing the dirt away from the plants. Fig. 2 is a similar view, arranged for throwing the dirt toward the plants; and Fig. 3 is a bottom perspective view of one of the scrapers.

The object of this invention is to provide an implement specially adapted to the cultivation of cotton; and to this end it consists in the combination of a suitable frame provided with teeth with a pair of peculiarly-constructed cutters or coverers susceptible of various uses, whereby the plants may be either freed from weeds or the dirt thrown toward or from them, as required, at their different stages of growth, or adapted to cover the cotton when first planted, all as will be hereinafter more particularly pointed out.

To enable others skilled in the art to avail themselves of the benefits of my invention, I will now proceed to describe its construction and operation.

A represents the frame of my machine, which is an ordinary harrow or cultivator, provided with the usual teeth, handles, and clevis.

C C represent the coverers, which consist of blades made of steel, beveled at their front ends, their lower edge sharpened, and their upper edge turned outward at right angles. These blades or coverers are also slightly convexed on their inner sides and concaved on the outer sides. On their inner sides they are provided with elongated staples $e\ e$, and slotted in their right-angle bend at their upper edge, as seen at $b\ b$ in Fig. 3.

The mode of using the device is as follows: To cut weeds or throw the dirt away from the plant in its early stage, they are arranged, as seen in Fig. 1, with one of the staples $e\text{-}e$ clasping one of the harrow-teeth and bolted to the frame through the slots, as shown, so they may be adjusted to leave a greater or less opening at their forward ends, through which the plant passes. Being nearer together at their forward than at their rear ends, the dirt is thrown away from the plants.

Fig. 2 shows the coverers secured to the side bars of the harrow at their forward ends, and their rear ends brought nearer together and secured to the cross-bar of the frame for throwing the dirt toward the plant when it attains a proper growth, and for covering it when first planted. By this arrangement it will be seen that I obtain a very cheap, simple, and efficient device for attachment to an ordinary farm-harrow, and adapted to cultivate cotton in all its stages of growth.

Having thus fully described my invention, what I claim, and desire to secure by Letters Patent, is—

The combination, with the frame and teeth of a harrow or cultivator, of the coverers C C, provided with staples $e\ e$ and slots $b\ b$, whereby the said coverers are adapted to be adjusted and secured upon the teeth in the several positions specified, substantially as and for the purpose set forth.

In testimony that I claim the foregoing as my own I affix my signature in presence of two witnesses.

JAMES L. FARNSWORTH.

Witnesses:
T. R. JONES,
R. J. MCCARNY.